Patented May 13, 1952

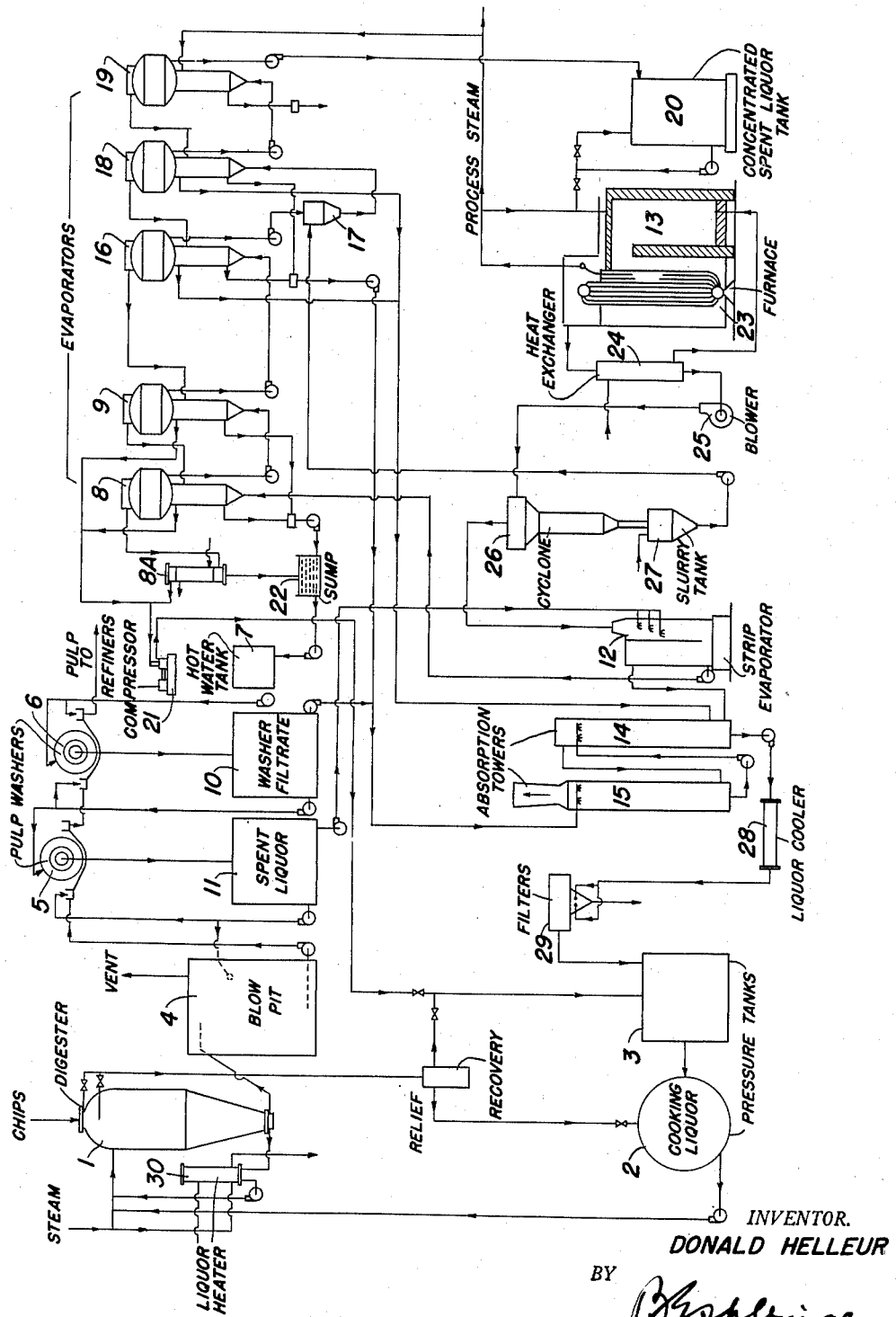

2,596,241

UNITED STATES PATENT OFFICE 2,596,241

TREATMENT OF THE SPENT COOKING LIQUOR OF AN AMMONIA BASE SULFITE PULPING PROCESS

Donald Helleur, Kenogami, Quebec, Canada, assignor to Price Brothers & Company, Limited, Quebec, Quebec, Canada, a corporation Application December 20, 1948, Serial No. 66,308

4 Claims. (Cl. 23—129)

My invention relates to processes for digesting wood chips or other ligno-cellulose materials to produce pulp, in which ammonia is a principal cation of the cooking liquor, and, more particularly, the invention relates to the recovery of chemicals and heat from the spent cooking liquor.

It is well known that the ammonium sulphite processes for digesting wood chips, besides being very flexible, produce superior pulps at higher yields than the standard calcium bisulphite process. The former, however, have found only very limited industrial application because of the high cost of ammonia as compared with lime, and of a lack, up to the present, of a practical method for recovering chemicals from the spent liquors.

It is a main object of my present invention to provide a practical method for recovering sulphur dioxide and ammonia from the spent cooking liquor of an ammonia base sulphite pulping process to a degree which renders the process nearly self-sustained in regard to chemical requirements.

A further object of my invention is to provide for the economic recovery of the potential fuel value of the spent cooking liquor in question and render the pulping and recovery process self-sustained in regard to heat requirements.

A further object of my invention is the utilization of the spent cooking liquor in question in such a way that the usual obnoxious pollution of adjacent waterways by the liquor is completely eliminated.

In brief the method of my invention comprises cooking ligno-cellulose materials with a cooking liquor made up of a combination of water, sulphur dioxide and ammonia, with or without magnesium oxide as an additional basic component, separating the pulpy material from the spent cooking liquor, treating the spent liquor, with or without pre-stripping residual sulphur dioxide from the liquor, with magnesium oxide to liberate ammonia from ammonium compounds present in the liquor, evaporating the magnesia treated spent liquor to a combustible concentration, burning the concentrated spent liquor in a steam boiler to produce process steam, recovering sulphur dioxide from the combustion gases using ammonia as the active agent, and recovering magnesium oxide from the combustion ash.

It will be apparent from the above outline that sulphur dioxide and ammonia required for the pulping process are continuously regenerated from the spent pulping liquor, and that except for small manipulation losses all of these reagents are recoverable in the process. Likewise, all the magnesium oxide used to liberate the ammonia is recoverable to the regeneration process. Only small amounts of makeup chemicals are required. Furthermore the combustion of the evaporated spent liquor usually generates more than sufficient steam to supply the full requirements of the pulping and recovery processes. Thus the method of my invention permits large saving in chemicals and fuel over the requirements of the standard calcium bisulphite process, and in addition permits a realization of all the advantages of the ammonium sulphite process.

The feature of my invention specifying magnesium oxide as the base for obtaining ammonia from the spent cooking liquor is of particular importance. If no base were added and the ammonium compounds in the liquor were carried through the combustion step, much of the ammonia would be irretrievably lost by decomposition in the furnace. If sodium hydroxide were used for liberating ammonia from the liquor, the sodium base would be lost for reuse in the process, since under the conditions of combustion it would form an ash of mixed sulphur compounds of a type unsuitable for reuse in the regeneration of ammonia from the spent liquor or in the sulphite pulping process. If lime were used for the liberation of ammonia from the liquor, the lime and sulphur would likewise be lost to the process through formation of a combustion ash consisting mainly of calcium sulphate. In addition, use of lime would render evaporation of the treated liquor an expensive and troublesome operation due to the formation of calcium bearing scale on the heat exchange surfaces. Magnesium oxide, on the other hand, has none of these disadvantages. Its compounds do not form troublesome scale in the evaporation step and they ash to recoverable magensium oxide in the combustion step. Magnesium oxide is therefore a specific and desirable agent for regeneration of ammonia from the spent cooking liquor in the cyclic pulping and recovery method of my present invention.

Other objects, advantages, and novel features of my invention will be apparent as it is better understood from a study of the specification and of the accompanying diagram in which I have illustrated and described and embodiment of my invention.

In the drawing:

In the figure, 1 represents a pulp digester of the usual type equipped with indirect heating. The digester is charged in the usual manner with wood chips and a cooking liquor containing ammonium bisulphite and excess sulphur dioxide.

During the cooking operation a certain amount of sulphur dioxide is relieved from the digester at high pressure into a pressure tank 2 where it is absorbed in a supply of strong cooking liquor stored therein. A second pressure tank 3, holding cooking liquor make-up at a lower pressure likewise receives sulphur dioxide as relieved from the digester at lower pressures near the end of the cook, and serves also for absorbing sulphur dioxide from other points of the recovery system as will be described.

At the completion of the cooking operation the contents of the digester are discharged into a blow pit 4 from which gases are vented and the pulp and liquor pumped to suitable pulp washing equipment such as rotary vacuum filters 5 and 6 arranged in series.

Hot water from tank 7, containing condensate from the first bank of conventional evaporator effects 8, 9, as will be hereinafter described, is used to wash the pulp at the last washer 6. The filtrate from washer 6, containing a lean solution of ammonium compounds and a small amount of insoluble impurities, which are removed from the pulp by wash water from tank 7, is discharged into tank 10. This filtrate in tank 10 is used in three ways; part is used to wash the pulp at washer 5; part is used to regulate the consistency of the pulp going to washer 6; and the remainder is used along with the condensate from the second bank of evaporator effects 16, 18 as make-up water for fresh cooking liquor as will be hereinafter described.

Filtrate from washer 5, comprising the main body of the spent liquor is discharged into a storage tank 11. The spent liquor in this tank will have a dissolved solids content of approximately 10%. A portion of this spent liquor is returned to the pulp at the blowpit 4 and at the washer 5 to maintain the desired consistency at these points.

The rest of the spent liquor from tank 11 is delivered through sprays into a conventional gas scrubber or strip evaporator 12 where it is treated with the hot gases from the chemical recovery furnace 13 as will be hereinafter described. This treatment serves several purposes. It cools the hot gases and thereby facilitates the recovery of sulphur dioxide in the absorption towers 14 and 15 as hereinafter described. It partially evaporates the spent liquor and so reduces the amount of concentrating to be done in the multiple evaporators. It liberates free sulphur dioxide from the dilute liquor for subsequent recovery in the absorption towers. It recovers residual magnesium oxide ash suspended in the hot gases with partial neutralization of the spent liquor and consequent reduction of corrosion in evaporating and handling equipment. The amount of residual ash present in the gases can be controlled by varying the operation of the cyclones and in this way the amount of neutralization of the spent liquor at the strip evaporator 12 may in turn be controlled. It is desirable that the neutralization of the spent liquor at this stage be held below the point where ammonia would be liberated in the liquor, since the presence of free ammonia in the first bank of evaporator effects 8, 9 would mean that the condensate from these effects, which is used as wash water at pulp washer 6, would contain ammonia and part of this ammonia would be lost to the stock leaving washer 6.

The liquor is withdrawn from the strip evaporator 12 and delivered to the evaporator 8. The partly concentrated liquor then flows to evaporator 9 which is heated by the volatiles from effect 16 of the second bank evaporators 16, 18 and 19. After the liquor is partly concentrated in the first bank of evaporators it is delivered to evaporator 16. Then the further concentrated liquor is delivered through a conventional mixer 17 where magnesium oxide slurry is injected into the liquor stream. Sufficient magnesium oxide is introduced here to insure complete liberation of the chemically combined ammonia for its subsequent separation in standard evaporator effects 18 and 19. This usually requires an excess over the amount equivalent to the combined ammonia present in the spent liquor. The treated liquor then passes through the balance of the evaporator system, consisting of effects 18 and 19. From effect 19 it is delivered at a combustible concentration to a storage tank 20.

In the evaporation system, the uncondensed gases and vapours from the heating mediums in effects 16 and 18, consisting mainly of ammonia, are delivered to the bottom of the first absorption tower 14. The condensate also containing ammonia, from these same effects 16, 18, is delivered along with part of the filtrate from the last pulp washer 6 as hereinbefore described, to the top of the second absorption tower 15. Alternatively, the condensate from effects 16 and 18, may be delivered to the top of the first absorption tower 14. If desired, the condensate and filtrate may be cooled prior to its delivery to the absorption towers.

The uncondensed gases from the heating medium of effects 8, 9 may or may not contain recoverable amounts of sulphur dioxide depending on the extent of neutralization carried out in the strip evaporator. If sufficient recoverable sulphur dioxide is present in these gases, they are drawn off to compressor 21 and delivered under pressure into make-up cooking liquor in tank 3. Alternatively, these gases may be combined with the furnace gases going to the absorption towers where as described sulphur dioxide is recovered. The condensate from effects 8 and 9 is delivered to a sump tank 22 whence it is delivered to hot water storage tank 7, for use as described in washing the pulp at the last washer 6. Vapours from effect 8 are delivered to a conventional condenser 8A, the condensate passing to sump tank 22 and the uncondensed gases, containing sulphur dioxide, going to compresser 21. The condensate in sump tank 22 may also be used for adjusting the concentration of the cooking acid.

The concentrated spent liquor is delivered from tank 20 to a steam generation unit consisting of furnace 13 and boiler 23 and burned therein in suspension under self-sustaining combustion conditions to yield a dry ash consisting mainly of magnesium oxide. The hot combustion gases, carrying the bulk of the finely divided magnesium oxide ash, pass through a conventional heat exchanger 24 where they heat the ingoing air to the furnace. They are then delivered through a blower 25 to dust catchers or cyclones 26 where most of the magnesium ash is separated from the hot gases, the latter being delivered to the strip evaporator 12 as hereinbefore described.

From the strip evaporator 12, the cooled gases are delivered to the first absorption tower 14, which is serially connected with the second absorption tower 15, and mingle with the gases delivered here from the evaporation system, and pass counter current to the downward flow of ammonia-bearing liquor supplied at the top of the second absorption tower 15, as hereinbefore described. During this passage through the tower, the ammonia combines with the sulphur dioxide and forms a solution of sulphited ammonia.

The solution of sulphited ammonia from the absorption towers 14 and 15 is passed through a liquid cooler 28 and then through a filter 29, where it is freed of insoluble impurities which may have been picked up in the various recovery steps. From filter 29 the sulphited ammonia liquor is delivered to pressure tanks 3 and 2, where it is fortified with sulphur dioxide relief from digester 1 as hereinbefore described. The ammonium bisulphite liquor containing excess sulphur dioxide in tank 2 is used to supply cooking liquor to digester 1.

The above description serves as an example in illustrating my invention. Depending on the economic conditions under which my process is to operate and on the type of cooking acid required, modifications and various well-known techniques of heat and chemical economy may be applied.

I find, that my process may be adopted quite readily to a wide range of ammonium sulphite cooking liquors. These liquors may be acid through containing an excess of sulphur dioxide, neutral through a chemical balance of ammonia and sulphur dioxide, or alkaline though containing an excess of ammonia. In the latter case, recovery of free ammonia from the digester relief gases can be affected in a manner similar to that used for recovery of free sulphur dioxide in the above illustration.

The flexibility of my process can be extended further. It can be extended to those cooking liquors containing mixed bases, in which ammonia is one such base. In particular, my process can be applied to a mixed ammonia and magnesium base sulphite cooking liquor; for it is apparent that any magnesium base, included in the cooking liquor, will follow through the cycle described and reappear in the recovered chemicals for making up fresh cooking liquor. These ammonia-magnesium sulphite liquors also may be acid through their containing an excess of sulphur dioxide, neutral through a chemical balance of ammonia and magnesium with sulphur dioxide, or alkaline through containing free ammonia. The exact proportion of these two bases, would be determined partly by the economic factors of the particular locality and partly by the quality and type of pulp desired.

In addition my process may be applied to cooking liquors containing other inorganic ammonium compounds, such as ammonium sulphate, ammonium sulphide and ammonium hydroxide, and also to those liquors containing organic compounds, such as urea, from which ammonia is liberated during the cooking process.

The essential requirement of the cooking liquor, for the application of my process, is that the spent liquor contain combined ammonia in a recoverable amount.

In the above illustration, the spent liquor was treated with magnesium oxide slurry after it had been partly concentrated, and the condensates from the several evaporator effects were divided into two sections and these sections used for separate purposes. Other arrangements may be used. For example, the magnesium oxide necessary to liberate the combined ammonia may be added to the spent liquor before it is subjected to a multiple effect evaporation, and part or all of the ammonia-bearing condensate from these effects used in the making up of fresh cooking liquor. Also, if desired, the magnesium oxide may be added to the spent liquor in successive treatments, rather than all at once as illustrated above. This may be done by injecting definite amounts of magnesium oxide into the partly concentrated spent liquor going to the separate evaporator effects so that a controlled amount of ammonia is liberated in each effect.

In the above illustrated example, the distillation of ammonia and the evaporation of the spent liquor are carried out together. If desired, the distillation of ammonia may be performed separately. In this case, the partly evaporated spent liquor may be removed from the evaporation system for treatment with magnesium oxide and subsequent distillation of ammonia, and then returned to the evaporation system for final concentration.

One of the important features provided by my invention is the use of ammonia as an active agent in the recovery of sulphur dioxide from the furnace gases. Ammonia serves in an ideal manner for this purpose, since it is reactive in the absorption towers both as a gas and as a solution, and since it and the compounds which it forms with the sulphur dioxide are very soluble in water. The lean sulphur dioxide values of the furnace gases are thus efficiently recovered in usable form and concentration. It follows that it is desirable to maintain an operating balance of the various stages of the cyclic process so that ample ammonia is conserved for this use. To this end, I avoid use of ammonia as an active agent for recovering sulphur dioxide at other points where the sulphur dioxide is of a concentration which permits its recovery by compression or direct absorption in water.

Chemical losses may be made up as follows: magnesium oxide, by adding magnesium compounds, such as magnesium sulphate, to the concentrated liquor prior to burning; sulphur dioxide, by adding sulphur dioxide, as a gas or a liquid, to the solution of sulphited ammonia after the absorption towers; and ammonia, by adding liquid ammonia at the absorption towers.

While the invention has been described in connection with a particular embodiment thereof, then, it will be understood that it is capable of further modification, and that this application is intended to cover various changes in form, construction and operation of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention what I claim is:

1. The method of treating the spent cooking liquor resulting from the digestion of cellulosic fibrous material in an ammonium base sulphite cooking liquor, which comprises adding magnesium oxide to the spent cooking liquor to convert said spent cooking liquor to magnesium base spent liquor and to liberate ammonia, concentrating said magnesium base spent liquor by evaporation to a combustible concentrate, calcining said concentrate to recover magnesium oxide as an ash and to yield combustion gases containing sulphur dioxide, and bringing said liberated ammonia into intimate contact with said combustion gases in the presence of water to produce sulphited ammonia for fresh ammonium base sulphite cooking liquor.

2. A cyclic chemical recovery process for treating the residual liquor which results from the digestion of cellulosic fibrous material in an ammonium base sulphite cooking liquor and from the separation of the cooked fibrous material from the spent ammonium base liquor, said process comprising adding magnesium oxide to the ammonium base spent liquor to convert said ammonium base spent liquor to magnesium base spent liquor and to liberate ammonia, concentrating said magnesium base spent liquor by evaporation to a combustible concentrate, calcining said concentrate to recover magnesium oxide as an ash and to yield combustible gases containing sulphur dioxide, bringing said liberated ammonia into intimate contact with said combustion gases in the presence of water to produce sulphited ammonia for fresh ammonium base sulphite cooking liquor, and mixing the recovered magnesium oxide with other ammonium base spent liquor to continue the process.

3. A cyclic heat and chemical recovery process for treating the spent cooking liquor resulting from the digestion of fibrous ligno-cellulosic material in a cooking liquor comprising water, sulphur dioxide, and ammonia, in combination, said process comprising treating the spent cooking liquor with magnesium oxide to convert said spent cooking liquor to magnesium base spent liquor and to liberate ammonia, concentrating said magnesium base spent liquor by evaporation to a combustible concentrate, burning the concentrate as fuel in a steam boiler to yield combustion products composed of magnesium oxide ash and of gases containing sulphur dioxide, mixing the magnesium oxide ash with spent cooking liquor to continue the process, and bringing the combustion gases containing sulphur dioxide into intimate contact with said liberated ammonia in the presence of water to produce sulphited ammonia for fresh cooking liquor.

4. A cyclic heat and chemical recovery process for treating the spent cooking liquor resulting from the digestion of fibrous ligno-cellulosic material in a cooking liquor comprising water, sulphur dioxide, and ammonia, in combination, said method comprising mixing the spent cooking liquor with magnesium oxide to convert said spent cooking liquor to magnesium base spent liquor and to liberate ammonia therefrom, concentrating the mixture by evaporation to provide an ammonia bearing condensate and a residual magnesium base concentrate, burning the residual magnesium base concentrate as a fuel in a steam boiler to recover the heat value of the spent cooking liquor and to yield combustion products composed of magnesium oxide ash and of gases containing sulphur dioxide, mixing the magnesium oxide ash with spent cooking liquor to continue the process, and bringing the combustion gases containing sulphur dioxide into intimate contact with said liberated ammonia and with said ammonia bearing condensate to produce sulphited ammonia for fresh cooking liquor.

DONALD HELLEUR.

REFERENCES CITED

The following references are of record in the file of this patent:

UNITED STATES PATENTS

| Number | Name | Date |
|---|---|---|
| 932,130 | Hunter | Aug. 24, 1909 |
| 1,100,519 | Brech et al. | June 16, 1914 |
| 1,780,842 | Richter | Nov. 4, 1930 |
| 1,795,754 | Bradley et al. | Mar. 10, 1931 |
| 1,885,764 | Richardson | Nov. 1, 1932 |
| 1,891,337 | Seaman | Dec. 20, 1932 |
| 1,904,170 | Richter | Apr. 18, 1933 |
| 1,926,002 | Hahn et al. | Sept. 5, 1933 |
| 1,943,345 | Richardson | Jan. 16, 1934 |
| 2,014,374 | Brill | Sept. 17, 1935 |
| 2,032,437 | Richter | Nov. 3, 1936 |
| 2,320,294 | Palmrose et al. | May 25, 1943 |
| 2,385,955 | Tomlinson | Oct. 2, 1945 |

FOREIGN PATENTS

| Number | Country | Date |
|---|---|---|
| 9,831 | Great Britain | of 1885 |
| 5,762 | Great Britain | of 1888 |

OTHER REFERENCES

Mellor: "A Comprehensive Treatise on Inorganic and Theoretical Chemistry," vol. 4, pages 287, 290, 291, 370. Longmans, Green & Co., N. Y.

Mellor: "Modern Inorganic Chemistry," single volume edition, New Impression of Eighth Edition, published in Jan. 1935. Longmans, Green & Co., N. Y.—Page 402.